United States Patent [19]

Lankamp

[11] 3,985,660

[45] Oct. 12, 1976

[54] MATERIAL DISPLAYING A LOW COEFFICIENT OF FRICTION AND LOW WEAR AT HIGH LOAD AND SPEED

[75] Inventor: Herman Lankamp, Odijk, Netherlands

[73] Assignee: SKF Industrial Trading and Development Company, B.V., Jutphaas, Netherlands

[22] Filed: Sept. 2, 1975

[21] Appl. No.: 609,597

Related U.S. Application Data

[63] Continuation-in-part of Ser. No. 503,432, Sept. 5, 1974, abandoned.

[30] Foreign Application Priority Data

Sept. 7, 1973 Netherlands ..................... 7312330

[52] U.S. Cl. ............................................... 252/12
[51] Int. Cl.² ..................... C10M 5/00; C10M 7/00
[58] Field of Search ................... 252/12, 12.2, 12.4, 252/12.6

[56] References Cited

UNITED STATES PATENTS

| 3,508,945 | 4/1970 | Haemer et al. ..................... 252/12 |
| 3,776,845 | 12/1973 | Watanabe et al. ..................... 252/12 |
| 3,838,048 | 9/1974 | Hedge et al. ..................... 252/12 |

*Primary Examiner*—Delbert E. Gantz
*Assistant Examiner*—I. Vaughn
*Attorney, Agent, or Firm*—Daniel M. Rosen

[57] ABSTRACT

Bearing materials having low coefficient of friction and high wear resistance comprise 50 to 90 percent by weight of a powdered solid lubricant bonded by a polymerized mixture of unsaturated organic compounds, containing at least 30% divinylbenzene. The solid lubricant is preferably $MoS_2$ or a mixture of $MoS_2$ and graphite. The binder is preferably polymerized technical divinylbenzene, a mixture of isomers.

8 Claims, 1 Drawing Figure

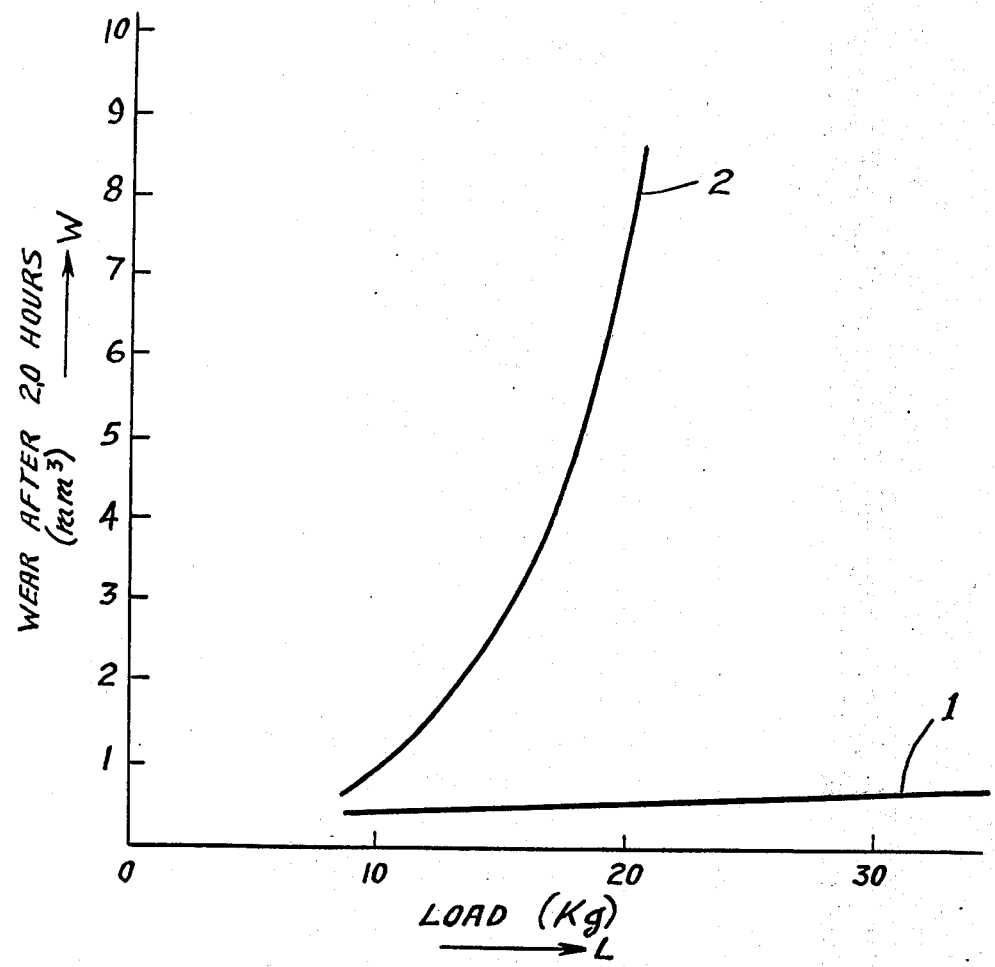

MATERIAL DISPLAYING A LOW COEFFICIENT OF FRICTION AND LOW WEAR AT HIGH LOAD AND SPEED

CROSS-REFERENCE TO RELATED APPLICATION

This is a continuation-in-part of pending application Ser. No. 503,432, filed Sept. 5, 1974, and now abandoned.

BACKGROUND OF THE INVENTION

The invention relates to a bearing material displaying a low coefficient of friction and low wear at relatively high load, relatively high speed and relatively high temperature.

Such materials are applied, for instance, as "dry" bearing material, i.e., bearing material requiring no additional lubricant on account of the low coefficient of friction, $\mu$. A potential application particularly is in plain bearings. The principal requirement of such materials is that, at the speeds, loads and temperatures involved, they always display a sufficiently low coefficient of friction and have a long service life.

A known example of such material is polytetrafluoroethylene (PFTE) which, applied in bearings involving very low speeds, such as in bearings supporting bridges, displays a $\mu$ of 0.02–0.05. In the majority of applications in bearings, the $\mu$ is higher, however, viz. 0.1–0.2. Generally, the $\mu$ of PTFE increases along with increasing speeds and decreases along with decreasing loads. As the transition temperature of PTFE is 327° C., particularly at high speeds and therefore at high temperatures, the material is not suitable as bearing material. Furthermore, the wear properties of PTFE measured, for example, with the aid of a "Falex tester" appear to be unfavorable and it is found that at pressures beyond 70 kg/cm², PTFE begins to deform, indicating that the rigidity of the material is insufficient at such pressures. The properties of PTFE as bearing material are described in the book "Lubrication and Lubricants", edited by E. R. Braithwaite, on pp. 412 et seq.

SUMMARY OF THE INVENTION

According to this invention, a material which, compared with PTFE, has more favorable properties as regards wear, and rigidity over a wide temperature range, is provided which consists essentially of 50–90 percent by weight of a powdered solid lubricant bonded by a polymerized mixture of unsaturated organic compounds, containing at least 30% divinylbenzene. The divinylbenzene generally consists of a mixture of isomers.

DESCRIPTION OF THE DRAWING

The accompanying drawing is a graph showing the relationship between load and wear after 2 hours for bearing material according to this invention and for a bearing material well known in the art. A more complete discussion of the drawing appears below.

DETAILED DISCLOSURE

The bearing materials of this invention consist essentially of from about 50 to about 90 percent by weight of a powdered solid lubricant bonded by a polymerized mixture of unsaturated organic compounds, said mixture containing at least 30 percent by weight of divinylbenzene.

The powdered solid lubricant used in the bearing materials of this invention may be any known lubricant answering this broad requirement, organic or inorganic. Preferably the lubricant is one which has a laminar structure, such as the chalkogenides ($MoS_2$, $WSe_2$, etc.), barium nitride, graphite, etc. On account of their laminated structure, all these substances display a low coefficient of friction, combined with high wear resistance, particularly suitable is $MoS_2$ or a mixture of $MoS_2$ and graphite.

The mixture of unsaturated organic compounds is characterized in having at least 30 weight percent of divinylbenzene. The remainder of the mixture consists of unsaturated polymerizable compounds such as, for example, styrene, alkyl substituted styrene (i.e., substituted either in the ring or in the vinyl moiety), butadiene, vinyl acetate, acrylic esters, methyl methacrylate, etc. If the amount of divinylbenzene is less than about 30 weight percent in the polymerized mixture, the desired qualities of the bearing material are reduced.

The divinylbenzene present in the mixture to be polymerized is a mixture of isomers having the structure

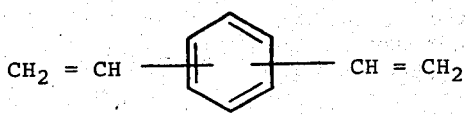

It is prepared by dehydrogenation of diethylbenzene, which itself may be a mixture of isomers. Technical divinylbenzene, which is the preferred bonding material of the present invention, comprises a major portion of divinylbenzene (mixture of isomers), and ethylvinylbenzene, the intermediate product of the dehydrogenation reaction (also a mixture of isomers). The divinylbenzene itself usually comprises about 70% of the meta-isomer and about 30% of the para-isomer. Similarly the ethylvinylbenzene will consist of a mixture of mainly the meta- and para-isomers. For reasons of economy, there is no need to separate the various isomers of divinylbenzene and there is no need to remove the ethylvinylbenzene by-product. If technical divinylbenzene is used as the binding material, however, it should preferably comprise at least 50 percent by weight of divinylbenzene. An example of the technical divinylbenzene which may be employed is the material manufactured by E. Merck (Munich, West Germany), which contains 54% of divinylbenzenes and 46% of ethylvinylbenzenes. As used herein the term "technical divinylbenzene" refers to a divinylbenzene composition comprising at least 30%, preferably at least 50% divinylbenzenes with the remainder consisting essentially of ethylvinylbenzene.

On polymerization, divinylbenzene gives a thermosetting resin, i.e., a three-dimensional network which is, in fact, one giant molecule. The resin decomposes at temperatures exceeding 250° C.

Especially preferred bearing materials are those having $MoS_2$ as the solid lubricant with the bonding material being technical divinylbenzene having at least 50 percent by weight of divinylbenzene.

The bearing materials of this invention are prepared by heating the solid lubricant and the unsaturated organic compounds to a temperature at which polymerization occurs. The polymerization can take place in a closed system (e.g. a mould) with or without pressure at the start. During the polymerization the system develops its own pressure. Generally, the polymerization rate increases with increasing temperature and the temperature to be used can be determined in accordance with known characteristics of the unsaturated organic compounds employed. With $MoS_2$ and technical divinylbenzene, the polymerization is conveniently run at about 150° C., and the reaction takes a few seconds. At 130° C., the identical reaction will take somewhat longer.

It appears that compressed pure $MoS_2$ powder has very poor wear properties, while, in this respect, there is nothing positive at all to be said as regards pure polydivinylbenzene. Moreover, polymerized divinylbenzene is very brittle, and therefore not usable as a plastic. However, the material obtained from $MoS_2$ powder and divinylbenzene mixed in the indicated quantities and in order to be polymerized heated at approximately 150° C. in a closed system or under pressure, surprisingly appears to have very favorable properties as compared with the materials hitherto used as bearing materials, such as PTFE.

EXAMPLE

The advantages of this invention are illustrated by reference to the following table. It shows values obtained by experiment, relating to the values of $\mu$, to the temperature arising and to the wear measured on a material during loading tests. These values are measured on cylindrical rolling elements of a material consisting of 75% $MoS_2$ and 25% polymerized technical divinylbenzene (supplied in an unpolymerized state by E. Merck as described above) as a function of the load. The relative speed of a rolling element in relation to the surface of the loading element, which consists of tempered and ground ball bearing steel, was constant at 1m/sec. The dimensions of the cylinders were: 10 mm long, 8 mm diameter. The ambient temperature was 25° C. The total testing time was 2 hours.

The same table also indicates the corresponding values of $\mu$, temperature and load, measured under the same conditions on cylinders of identical dimensions, made of glass-fiber-reinforced PTFE (total glass 20%), and made of pure PTFE.

The values of $\mu$ represent the coefficient of friction at which this factor ultimately reached its stable value, and the temperatures indicated are those relating to that coefficient.

TABLE

| material | load (kg) | $\mu$ | temperature (°C) | wear (mm³) |
| --- | --- | --- | --- | --- |
| 75% $MoS_2$ (microsize powder) in polymerized technical divinylbenzene | 10 | 0.12 | 50 | 0.4 |
| | 20 | 0.10 | 62 | 0.5 |
| | 30 | 0.25 | 140 | 0.6 |
| PTFE with 20% glass | 10 | 0.33 | 83 | 0.8 |
| | 20 | 0.35 | 100 | 8.0 |
| PTFE | 5 | 0.10 | | 10 |

The values load on the $MoS_2$-polydivinylbenzene indicated in the table (10, 20, 30 kg) correspond, respectively, to pressures on the roll of 5.5, 7.8 and 9.5 kg/mm². The "pressure" referred to is the pressure exerted on the roll at the moment when the test started and the cylinder was in linear contact with the the element exerting the load.

Comparison of the values of $\mu$, temperature and wear for the various materials shows the following.

1. Under identical loads the material according to the invention displays a lower $\mu$ than glassfiber-reinforced PTFE; while at a lower load the $\mu$ of pure PTFE is slightly lower.

2. Under identical loads the temperature at the surface of material according to the invention is lower than with glassfiber-reinforced PTFE.

3. Under identical loads the wear of materials according to the invention is lower than of the known materials.

4. As the load increases the wear of glassfiber-reinforced PTFE increases enormously from its initial value, whereas with the material according to the invention this occurs only at much higher loads. The material of this invention can therefore be used at higher loads without any appreciable adverse effect on service life. The drawing shows the relationship between load and wear for the material according to the invention — curve 1 — and for PTFE with 20% glass — curve 2. W represents wear after 2 hours in mm³ and L represents the load on the bearing material in kg.

5. The highest temperature at which the material according to this invention can be used in view of its resistance is about the same as for PTFE.

An additional advantage of the material according to the invention is that unlike PTFE, it displays a declining coefficient of friction as the speed increases.

According to another preferred feature of the invention it is advantageous under specific circumstances to replace part or all of the solid lubricant $MoS_2$ by graphite. It is true that the properties of the material as regards coefficient of friction, wear and loading capacity will be slightly less, but the economic advantage achieved by the use of graphite instead of $MoS_2$ can offset this.

The invention also comprises a shaped object made of the above-mentioned material. Suggested applications are in plain bearings inserts in the pockets of bearing cages, separators between rollers in bearings, etc. In order to enhance the compressibility of a shaped object it may, according to another feature of the invention, be provided with a reinforcing element. Such reinforcement may comprise glass fiber or glass matting, or asbestos.

What is claimed is:

1. A bearing material having a low coefficient of friction and low wear at relatively high load, relatively high speed and relatively high temperature, comprising from 50 to 90 percent by weight of a powdered inorganic solid lubricant bonded by a polymerized mixture of unsaturated organic compounds containing at least 30% divinylbenzene and the remainder selected from the group consisting of styrene butadiene, and vinyl acetate.

2. A material according to claim 1, in which the solid lubricant is a substance or a mixture of substances having a laminar structure.

3. A material according to claim 2, in which the solid lubricant is a chalkogenide, barium nitride or graphite.

4. A material according to claim 3, in which the solid lubricant is $MoS_2$.

5. A material according to claim 1, in which the organic binder is polymerized technical divinylbenzene, containing at least 50% divinylbenzene.

6. A material according to claim 5, in which the solid lubricant is $MoS_2$.

7. A material according to claim 6, in which the weight ratio of $MoS_2$ (microsize powder) and polymerized technical divinylbenzene is 75:25.

8. A material according to claim 3, in which the solid lubricant is a mixture of graphite and $MoS_2$.

* * * * *